United States Patent
Biasini et al.

(10) Patent No.: US 12,175,327 B1
(45) Date of Patent: Dec. 24, 2024

(54) CAMERA START OPTIMIZATION FOR OPTICAL PATTERN DECODING

(71) Applicant: Scandit AG, Zurich (CH)

(72) Inventors: Marco Biasini, Lucerne (CH); Daniel Scherly, Zurich (CH); Julien Silva, Zurich (CH); Iciar Martinez, Madrid (ES); Raffaele Farinaro, Zurich (CH); Nurie Jeong, Zurich (CH)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 18/424,428

(22) Filed: Jan. 26, 2024

Related U.S. Application Data

(63) Continuation of application No. 18/331,877, filed on Jun. 8, 2023, which is a continuation of application
(Continued)

(51) Int. Cl.
*G06K 7/14* (2006.01)
*G06F 1/16* (2006.01)
(Continued)

(52) U.S. Cl.
CPC ........... *G06K 7/146* (2013.01); *G06F 1/1605* (2013.01); *G06F 1/1626* (2013.01); *H04N 23/62* (2023.01);
(Continued)

(58) Field of Classification Search
USPC ..... 348/207.99; 235/462.11, 462.24, 462.32, 235/462.45
See application file for complete search history.

(56) References Cited

U.S. PATENT DOCUMENTS

| 4,167,756 A | 9/1979 | Smith |
| 5,216,236 A | 6/1993 | Blais |

(Continued)

FOREIGN PATENT DOCUMENTS

| EP | 3167404 A1 | 5/2017 |
| EP | 2195123 B1 | 5/2018 |

(Continued)

OTHER PUBLICATIONS

"Barcode and Zone OCR Capture", Docsvault, Available Online at: https://www.docsvault.com/docs/barcode-zone-ocr-capture.pdf, Dec. 22, 2021, 2 pages.
(Continued)

*Primary Examiner* — Edwyn Labaze
(74) *Attorney, Agent, or Firm* — Kilpatrick Townsend & Stockton LLP

(57) ABSTRACT

Prior to capturing images, a camera is turned on and a first image depicting a first optical pattern is captured and a first optical pattern is decoded within the first image. The camera is switched to a first mode corresponding to a first power consumption level. It is ascertained whether the camera has been in the first mode for a first period of time and, if so, the camera is switched to a second mode corresponding to a second power consumption level that is less than the first power consumption level. A code scanning request is detected while the camera is in the second mode and, in response to detecting that the code scanning request has been received while the camera is in the second mode, a second image depicting a second optical pattern is captured with the camera.

20 Claims, 11 Drawing Sheets

Related U.S. Application Data

No. 17/549,217, filed on Dec. 13, 2021, now Pat. No. 11,803,718, and a continuation of application No. 17/541,957, filed on Dec. 3, 2021, now Pat. No. 11,922,271, said application No. 17/549,217 is a continuation of application No. 17/186,909, filed on Feb. 26, 2021, now Pat. No. 11,216,628.

(60) Provisional application No. 63/433,236, filed on Dec. 16, 2022, provisional application No. 63/350,338, filed on Jun. 8, 2022, provisional application No. 63/337,622, filed on May 3, 2022, provisional application No. 63/149,009, filed on Feb. 12, 2021, provisional application No. 63/121,408, filed on Dec. 4, 2020.

(51) Int. Cl.
  *G06K 7/10* (2006.01)
  *H04N 23/62* (2023.01)
  *H04N 23/67* (2023.01)

(52) U.S. Cl.
  CPC ... *H04N 23/67* (2023.01); *G06K 2007/10524* (2013.01); *G06K 7/1413* (2013.01)

(56) References Cited

U.S. PATENT DOCUMENTS

| | | |
|---|---|---|
| D344,261 S | 2/1994 | Watanabe |
| 5,422,469 A | 6/1995 | Bard et al. |
| 5,486,944 A | 1/1996 | Bard et al. |
| 5,744,815 A | 4/1998 | Gurevich et al. |
| D473,872 S | 4/2003 | Ausems et al. |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |
| D658,174 S | 4/2012 | Tasselli et al. |
| D659,564 S | 5/2012 | Baxter |
| 8,223,203 B2 | 7/2012 | Ohsumi et al. |
| D667,823 S | 9/2012 | Merenda |
| D670,278 S | 11/2012 | Hamann |
| D672,386 S | 12/2012 | Matunuma et al. |
| D678,870 S | 3/2013 | Fathollahi |
| D678,936 S | 3/2013 | Oliver |
| D685,360 S | 7/2013 | Chen et al. |
| D688,654 S | 8/2013 | Stevinson |
| 8,596,540 B2 | 12/2013 | Adelmann |
| D698,772 S | 2/2014 | Merenda |
| 8,744,173 B2 | 6/2014 | Vincent et al. |
| D710,343 S | 8/2014 | Chandler, Jr. et al. |
| D710,346 S | 8/2014 | Smith et al. |
| 8,798,453 B2 | 8/2014 | Lawton |
| D716,285 S | 10/2014 | Chaney et al. |
| D716,785 S | 11/2014 | White |
| D717,287 S | 11/2014 | Macrina et al. |
| D717,304 S | 11/2014 | Yturralde et al. |
| D719,166 S | 12/2014 | Brown et al. |
| D719,167 S | 12/2014 | Brown et al. |
| D724,573 S | 3/2015 | Stevinson |
| D726,701 S | 4/2015 | Stevinson |
| 9,019,420 B2 | 4/2015 | Hurst et al. |
| D728,551 S | 5/2015 | Saeki et al. |
| D732,011 S | 6/2015 | Stevinson |
| D733,112 S | 6/2015 | Chaney et al. |
| D734,336 S | 7/2015 | Mistkawi et al. |
| D744,470 S | 12/2015 | Stevinson |
| D748,085 S | 1/2016 | Merenda |
| D754,114 S | 4/2016 | Curtis et al. |
| D754,650 S | 4/2016 | Curtis et al. |
| D759,004 S | 6/2016 | Stevinson |
| D760,209 S | 6/2016 | Weng et al. |
| D760,212 S | 6/2016 | Mao et al. |
| 9,378,435 B1 | 6/2016 | Prulhiere et al. |
| D760,710 S | 7/2016 | Ozolins et al. |
| D761,240 S | 7/2016 | Ozolins et al. |
| D768,617 S | 10/2016 | Merenda |
| D771,631 S | 11/2016 | Fitch et al. |
| 9,626,577 B1 | 4/2017 | Yu et al. |
| 9,654,675 B2 | 5/2017 | Kessler |
| 9,659,204 B2 | 5/2017 | Wu et al. |
| 9,836,635 B2 | 12/2017 | Negro et al. |
| 10,013,643 B2 | 7/2018 | Yellapragada et al. |
| 10,191,242 B2 | 1/2019 | Palmeri |
| 10,200,599 B1 | 2/2019 | Baldwin |
| 10,229,301 B2 | 3/2019 | Cumoli et al. |
| D860,180 S | 9/2019 | Lehmann et al. |
| D862,441 S | 10/2019 | Eppler et al. |
| 10,426,442 B1 | 10/2019 | Schnorr |
| 10,452,959 B1 | 10/2019 | Gautam et al. |
| 10,455,163 B2 | 10/2019 | Kanatsu |
| 10,489,668 B2 | 11/2019 | Quentin et al. |
| 10,558,844 B2 | 2/2020 | D'Ercoli et al. |
| 10,621,435 B2 | 4/2020 | Bridges et al. |
| 10,818,014 B2 | 10/2020 | Xu et al. |
| 10,846,561 B1 | 11/2020 | Floerkemeier et al. |
| 10,923,221 B1 | 2/2021 | Mann et al. |
| 10,963,658 B1 | 3/2021 | Bloch et al. |
| 11,003,891 B2 | 5/2021 | Chen |
| 11,087,105 B1 | 8/2021 | Biasini et al. |
| 11,216,628 B2 | 1/2022 | Scherly et al. |
| 11,244,147 B2 | 2/2022 | Floerkemeier et al. |
| 11,290,643 B1 | 3/2022 | Tullis et al. |
| 11,295,163 B1 | 4/2022 | Schoner et al. |
| 11,403,477 B1 | 8/2022 | Biasini et al. |
| 11,495,036 B1 | 11/2022 | Kündig et al. |
| 11,514,665 B2 | 11/2022 | Nater et al. |
| 11,532,149 B1 | 12/2022 | Floerkemeier et al. |
| 11,562,551 B1 | 1/2023 | Oertel et al. |
| 11,615,610 B1 | 3/2023 | Floerkemeier et al. |
| 11,636,709 B2 | 4/2023 | Floerkemeier et al. |
| 11,803,718 B1 | 10/2023 | Scherly et al. |
| 11,803,719 B1 | 10/2023 | Biasini et al. |
| 11,869,258 B1 | 1/2024 | Kündig et al. |
| 11,922,271 B1 | 3/2024 | Biasini et al. |
| 2003/0059124 A1 | 3/2003 | Center, Jr. |
| 2003/0202697 A1 | 10/2003 | Simard et al. |
| 2004/0193538 A1 | 9/2004 | Raines |
| 2004/0206822 A1 | 10/2004 | Crandall |
| 2006/0011724 A1 | 1/2006 | Joseph et al. |
| 2006/0075241 A1 | 4/2006 | Deguillaume et al. |
| 2006/0249581 A1 | 11/2006 | Smith |
| 2007/0116454 A1 | 5/2007 | Tsai |
| 2007/0181810 A1 | 8/2007 | Tan et al. |
| 2008/0278785 A1 | 11/2008 | Klose et al. |
| 2009/0002797 A1 | 1/2009 | Kwong et al. |
| 2009/0033786 A1 | 2/2009 | Finkelstein et al. |
| 2009/0108071 A1 | 4/2009 | Carlson |
| 2009/0212113 A1 | 8/2009 | Chiu et al. |
| 2009/0304234 A1 | 12/2009 | Kondo et al. |
| 2010/0102129 A1 | 4/2010 | Drzymala et al. |
| 2010/0252633 A1 | 10/2010 | Barkan et al. |
| 2010/0328420 A1 | 12/2010 | Roman |
| 2011/0007205 A1 | 1/2011 | Lee |
| 2011/0043683 A1 | 2/2011 | Beach et al. |
| 2011/0081946 A1 | 4/2011 | Singh |
| 2011/0168776 A1 | 7/2011 | Jalali et al. |
| 2012/0227263 A1 | 9/2012 | LeClair et al. |
| 2013/0076697 A1 | 3/2013 | Goertz et al. |
| 2013/0112750 A1 | 5/2013 | Negro et al. |
| 2013/0147839 A1 | 6/2013 | Fukushima et al. |
| 2013/0206839 A1 | 8/2013 | Gao |
| 2013/0266326 A1 | 10/2013 | Joseph et al. |
| 2013/0329115 A1 | 12/2013 | Palmeri |
| 2014/0025973 A1 | 1/2014 | Schillings et al. |
| 2014/0027503 A1 | 1/2014 | Kennedy et al. |
| 2014/0168468 A1 | 6/2014 | Levoy et al. |
| 2014/0171150 A1 | 6/2014 | Hurst et al. |
| 2014/0232930 A1 | 8/2014 | Anderson |
| 2014/0247278 A1 | 9/2014 | Samara et al. |
| 2014/0285686 A1 | 9/2014 | Cho et al. |
| 2014/0285913 A1 | 9/2014 | Palmeri |
| 2014/0327815 A1 | 11/2014 | Auger |

(56) References Cited

U.S. PATENT DOCUMENTS

| | | | |
|---|---|---|---|
| 2014/0344729 A1 | 11/2014 | Blanco et al. | |
| 2015/0048167 A1 | 2/2015 | Russell et al. | |
| 2015/0053765 A1 | 2/2015 | Powell et al. | |
| 2015/0085083 A1* | 3/2015 | Chen | H04N 23/667 348/49 |
| 2015/0116547 A1 | 4/2015 | Laroia | |
| 2015/0220766 A1 | 8/2015 | Russell et al. | |
| 2016/0042315 A1 | 2/2016 | Field-Darragh et al. | |
| 2016/0070944 A1 | 3/2016 | McCloskey et al. | |
| 2016/0077307 A1 | 3/2016 | Palmeri | |
| 2016/0104021 A1 | 4/2016 | Negro et al. | |
| 2016/0161600 A1 | 6/2016 | Eldada et al. | |
| 2016/0171707 A1 | 6/2016 | Schwartz | |
| 2016/0188941 A1 | 6/2016 | Todeschini et al. | |
| 2016/0219218 A1 | 7/2016 | Kinoshita | |
| 2016/0253599 A1 | 9/2016 | Lang et al. | |
| 2016/0307006 A1 | 10/2016 | Wang | |
| 2016/0308932 A1 | 10/2016 | Gibbons et al. | |
| 2016/0321819 A1 | 11/2016 | Morgan-Mar et al. | |
| 2016/0323508 A1 | 11/2016 | Ayalasomayajula et al. | |
| 2016/0366348 A1 | 12/2016 | Dixon et al. | |
| 2017/0013179 A1 | 1/2017 | Kang et al. | |
| 2017/0032311 A1 | 2/2017 | Rizzolo et al. | |
| 2017/0041540 A1 | 2/2017 | Foster et al. | |
| 2017/0185400 A1 | 6/2017 | Shanbhogue et al. | |
| 2017/0236006 A1 | 8/2017 | Davis et al. | |
| 2017/0243097 A1 | 8/2017 | Loy et al. | |
| 2017/0285148 A1 | 10/2017 | Hipp | |
| 2017/0286732 A1 | 10/2017 | Lei et al. | |
| 2017/0307758 A1 | 10/2017 | Pei et al. | |
| 2018/0062345 A1 | 3/2018 | Bills et al. | |
| 2018/0081417 A1 | 3/2018 | Chan et al. | |
| 2018/0120106 A1 | 5/2018 | Sato | |
| 2018/0122194 A1 | 5/2018 | Schoner | |
| 2018/0137319 A1 | 5/2018 | Giordano et al. | |
| 2018/0139337 A1 | 5/2018 | Ghazizadeh | |
| 2018/0157885 A1 | 6/2018 | Gurzumar | |
| 2018/0180720 A1 | 6/2018 | Pei et al. | |
| 2018/0180722 A1 | 6/2018 | Pei et al. | |
| 2018/0314908 A1 | 11/2018 | Lam | |
| 2018/0342050 A1 | 11/2018 | Fitzgerald et al. | |
| 2019/0065803 A1 | 2/2019 | Burke et al. | |
| 2019/0120940 A1 | 4/2019 | Pei et al. | |
| 2019/0122012 A1 | 4/2019 | Lei et al. | |
| 2019/0188435 A1 | 6/2019 | Davis et al. | |
| 2019/0213523 A1 | 7/2019 | Adato et al. | |
| 2019/0244043 A1 | 8/2019 | Bradley et al. | |
| 2019/0304132 A1 | 10/2019 | Yoda et al. | |
| 2019/0325183 A1 | 10/2019 | Tscherepanow et al. | |
| 2019/0354923 A1 | 11/2019 | Taira et al. | |
| 2020/0018835 A1 | 1/2020 | Pei et al. | |
| 2020/0042803 A1 | 2/2020 | Yamaguchi | |
| 2020/0084375 A1 | 3/2020 | Tadano et al. | |
| 2020/0202095 A1 | 6/2020 | Yoda | |
| 2020/0258033 A1 | 8/2020 | Yonezawa et al. | |
| 2020/0304650 A1 | 9/2020 | Roach et al. | |
| 2021/0025212 A1 | 1/2021 | Markmiller et al. | |
| 2021/0125141 A1 | 4/2021 | Lipsey et al. | |
| 2021/0150618 A1 | 5/2021 | Glaser et al. | |
| 2021/0158278 A1 | 5/2021 | Bogolea et al. | |
| 2021/0191607 A1 | 6/2021 | Sefton | |
| 2021/0192162 A1 | 6/2021 | Rodriguez et al. | |
| 2021/0365885 A1 | 11/2021 | Timonen | |
| 2022/0138964 A1 | 5/2022 | Gintsburg et al. | |

FOREIGN PATENT DOCUMENTS

| | | |
|---|---|---|
| JP | 2002181533 A | 6/2002 |
| JP | 2003042723 A | 2/2003 |
| JP | 2003177348 A | 6/2003 |
| JP | 2004032507 A | 1/2004 |
| JP | 2004085225 A | 3/2004 |
| JP | 2009288099 A | 12/2009 |
| JP | 2010203907 A | 9/2010 |
| JP | 4966464 B2 | 7/2012 |
| JP | 2019094191 A | 6/2019 |
| KR | 20020077090 A | 10/2002 |
| KR | 20060102957 A | 9/2006 |
| WO | 0131893 A1 | 5/2001 |
| WO | 2016007662 A1 | 1/2016 |
| WO | 2019135163 A2 | 7/2019 |
| WO | 2021000063 A1 | 1/2021 |

OTHER PUBLICATIONS

"Code Reader 4405 User Manual", Code Product Line, Version 03, Available Online at: https://web.archive.org/web/20170624204013/http://codecorp.com/assets/manual/D018433-CR44X5--User-Manual.pdf, Jan. 2016, pp. 1-16.

"Computer Vision and Augmented Reality for Enterprise Applications", Scandit, Available Online at: https://www.scandit.com/resources/videos/computer-vision-and-augmented-reality-for-enterprise-applications, Jun. 6, 2018, pp. 1-2.

"ISBN Scan-OCR/BarcodeScanner", App Store Preview, Leontec, Designed for iPad, Available Online at: https://apps.apple.com/us/app/isbn-scan-ocr-barcodescanner/id891627785, Accessed from Internet on Jan. 17, 2022, 3 pages.

"Linea Pro Extreme Rugged Case", Infinite Peripherals, iOS Accessories, Linea Pro and Infinea Tab Accessories, Available Online at: https://web.archive.org/web/20150825044354/http://ipcprint.com/linea-pro-extreme-rugged-case.html, Accessed from Internet on Dec. 24, 2020, pp. 1-3.

"Scandit Augmented Reality for Smart Devices", Scandit, Available Online at: https://www.scandit.com/resources/videos/scandit-augmented-reality-for-smart-devices/, Oct. 2, 2019, pp. 1-2.

"Scandit Augmented Reality Retail Click and Collect", Scandit, Available Online at: https://www.scandit.com/resources/videos/scandit-augmented-reality-retail-click-and-collect/, Sep. 26, 2018, pp. 1-2.

"Scandit Augmented Reality Retail Price Label Verification", Scandit, Available Online at: https://www.scandit.com/resources/videos/scandit-augmented-reality-retail-price-label-verification/, Sep. 26, 2018, 1 page.

"Scandit Augmented Reality Retail Shelf Management", Scandit, Available Online at: https://www.scandit.com/resources/videos/scandit-augmented-reality-retail-shelf-management/, Sep. 26, 2018, pp. 1-2.

"Scandit Augmented Retail Product Information Using AR", Scandit, Available Online at: https://www.scandit.com/resources/videos/scandit-augmented-retail-product-information-using-ar/, Sep. 26, 2018, pp. 1-2.

"Structure of the IMEI and Imeisv (Imei Software Version)", Available Online at: https://en.wikipedia.org/wiki/International_Mobile_Equipment_Identity#Structure_of_the_IMEI_and_IMEISV_(IMEI_software_version), Nov. 29, 2021, 2 pages.

"Use OCR to Scan ISBN or UPC Number When There is No Barcode", A sellertool Solutions User Guide, Available Online at: https://www.asellertool.com/manual/1/en/topic/ocr-to-capture-isbn-number-if-no-barcode, Feb. 9, 2017, 12 pages.

Basilico, "Flens-The First Flashlight Booster for Smartphones", Available Online at: https://www.kickstarter.com/projects/basilico/flens-the-first-flashlight-booster-for-smartphones, Accessed from Internet on: Mar. 26, 2021, pp. 1-26.

Brownlee, "Deep Learning Models for Human Activity Recognition", Deep Learning for Time Series, Available Online at: https://machinelearningmastery.com/deep-learning-models-for-human-activity-recognition/, Sep. 26, 2018, pp. 1-16.

EP19884206.4, "Partial Supplemental European Search Report", Jul. 20, 2021, 13 pages.

Application No. JP2021-500376, Office Action, Mailed On Mar. 24, 2023, 9 pages.

Application No. PCT/IB2019/000049, International Preliminary Report on Patentability, Mailed On Jul. 23, 2020, 11 pages.

Application No. PCT/IB2019/000049, International Search Report and Written Opinion, Mailed On Aug. 1, 2019, 15 pages.

PCT/IB2019/000049, "Invitation to Pay Additional Fees And, Where Applicable, Protest Fee", Jun. 11, 2019, 10 pages.

(56) References Cited

OTHER PUBLICATIONS

Application No. PCT/US2012/043184 , International Preliminary Report on Patentability, Mailed On Jan. 9, 2014, 6 pages.
Application No. PCT/US2012/043184 , International Search Report and Written Opinion, Mailed On Feb. 27, 2013, 7 pages.
Application No. PCT/US2019/040963 , International Preliminary Report on Patentability, Mailed On Jan. 21, 2021, 8 pages.
Application No. PCT/US201919/40963 , International Search Report and Written Opinion, Mailed On Jul. 9, 2019, 14 pages.
Application No. PCT/US2021/025212 , International Preliminary Report on Patentability, Mailed On Oct. 13, 2022, 8 pages.
Application No. PCT/US2021/025212 , International Search Report and Written Opinion, Mailed On Aug. 12, 2021, 11 pages.
PCT/US2021/025212 , "Invitation to Pay Additional Fees And, Where Applicable, Protest Fee", Jun. 17, 2021, 2 pages.
Application No. PCT/US2023/024823 , International Search Report and Written Opinion, Mailed On Sep. 5, 2023, 9 pages.

\* cited by examiner

CAMERA START OPTIMIZATION FOR OPTICAL PATTERN DECODING

CROSS-REFERENCES TO RELATED APPLICATIONS

This application is a continuation of U.S. patent application Ser. No. 17/541,957, filed on Dec. 3, 2021, now U.S. Pat. No. 11,922,271, issued on Mar. 5, 2024, which claims priority to U.S. Provisional Application No. 63/121,408, filed Dec. 4, 2020. This application is a continuation of U.S. patent application Ser. No. 18/331,877, filed Jun. 8, 2023, which claims priority to Provisional Application No. 63/350,338, filed on Jun. 8, 2022, U.S. Provisional Application No. 63/337,622, filed on May 3, 2022, and U.S. Provisional Application No. 63/433,236, filed on Dec. 16, 2022. U.S. patent application Ser. No. 18/331,877 is a continuation of U.S. patent application Ser. No. 17/549,217, filed Dec. 13, 2021, now U.S. Pat. No. 11,803,718, issued on Oct. 31, 2023, which is a continuation of U.S. patent application Ser. No. 17/186,909, filed Feb. 26, 2021, now U.S. Pat. No. 11,216,628, issued on Jan. 1, 2022, which claims priority to U.S. Provisional Patent Application No. 63/149,009, filed Feb. 12, 2021. The disclosures of the above-noted applications (collectively, the "parent applications") are incorporated by reference for all purposes and priority to these applications is claimed.

BACKGROUND

This disclosure relates in general to a camera in a mobile device. More specifically, and without limitation, this disclosure relates to decoding optical patterns in an image of a real scene. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

Mobile devices having a camera, and being capable of hosting mobile applications, offer a flexible and scalable solution for optical pattern decoding. Making scanning easier and/or reducing scanning time can increase productivity. Using the camera can drain a battery of a mobile device faster than some other applications of the mobile device. Thus, there is a need for faster and/or improved optical-code scanning and/or extending battery life of the mobile device.

In some configurations, a system for decoding an optical pattern in a real scene comprises a camera and a memory device. The memory device comprises instructions that, when executed by one or more processors, cause the one or more processors to perform the following steps: acquiring a video stream using the camera; defining a viewport for a screen of a mobile device; presenting, in the viewport, the video stream on the screen of the mobile device; and/or decoding the optical pattern in one or more images of the real scene acquired by the camera. In some configurations, the video stream comprises preview images of the real scene; the optical pattern is in the real scene; at least a portion of the optical pattern is depicted in the viewport; the viewport is less than half an area of the screen of the mobile device; a center of the viewport is positioned on the screen to correspond to a center of the camera in relation to the screen; the preview images are cropped images acquired by the camera; and/or the optical pattern is decoded while the optical pattern does not fit within the viewport.

In some configurations, a method for decoding an optical pattern in a real scene comprises: acquiring a video stream using a camera of a mobile device, wherein the video stream comprises preview images of the real scene and the optical pattern is in the real scene; defining a viewport for a screen of the mobile device, wherein the viewport is less than half an area of the screen of the mobile device; presenting, in the viewport, the video stream on the screen of the mobile device, wherein at least a portion of the optical pattern is depicted in the viewport; and/or decoding the optical pattern in one or more images of the real scene acquired by the camera. In some configurations, a center of the viewport is offset from a center of the screen; a center of the viewport is positioned on the screen to correspond to a center of the camera in relation to the screen; the method comprises presenting a thumbnail image of the optical pattern on the screen while presenting the video stream in the viewport on the screen; the method comprises presenting a plurality of values of decoded optical patterns on the screen; the method comprises changing a size of the viewport based changing a scan mode for detecting and decoding the optical pattern; the camera is a first camera; the method comprises initiating a focus routine to focus on the optical pattern using a second camera of the mobile device, ascertaining that the optical pattern is too close for the second camera to focus on the optical pattern, and switching to the first camera to acquire the video stream based on the optical pattern being too close for the second camera to focus on; the first camera has a wider field of view than the second camera; the preview images are cropped images acquired by the camera; the preview images are cropped so that the preview images have a height equal to or less than 50% of a height of images acquired by a sensor of the camera; the optical pattern is decoded while the optical pattern does not fit within the viewport; and/or the method comprises overlaying the video stream with a graphic in the viewport to indicate that the optical pattern has been decoded.

In some configurations, a method for decoding an optical pattern in a real scene comprises acquiring a video stream using a camera of a mobile device, wherein the video stream comprises preview images of the real scene and the optical pattern is in the real scene; presenting an application window on a screen of a mobile device; overlaying the application window with a viewport, wherein the application window remains at least partially visible; presenting, in the viewport, the video stream on the screen of the mobile device, wherein at least a portion of the optical pattern is depicted in the viewport; and/or decoding the optical pattern in one or more images of the real scene acquired by the camera.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

Figure 1:
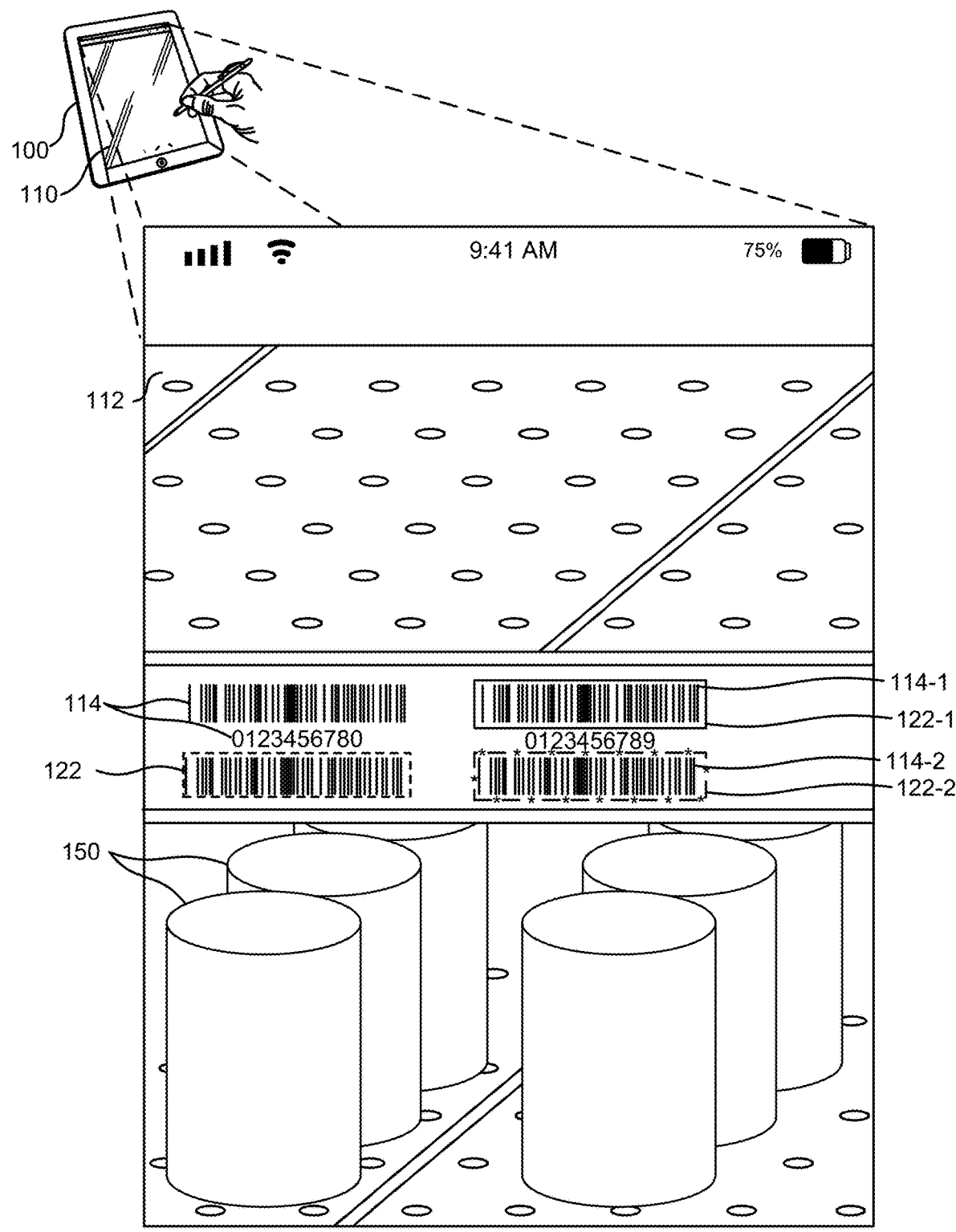
FIG. 1 depicts an example technique for automated recognition and decoding of a pattern in an image containing multiple patterns, in accordance with some embodiments.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

A. Mini Preview

A back-facing camera on a mobile device, such as a smartphone, is typically located in one of the corners, mostly the top-left or top-right corner while holding the phone in portrait orientation. There can be an offset between a preview of the camera and the camera while showing the preview in full screen on a display of the mobile device because there is an offset between a center of the camera sensor and a center of the display (e.g., because the center of the display coincides with a center of the mobile device, in some mobile devices). While aiming the camera quickly at an object, for example an optical pattern such as a barcode, it can be natural to assume that the screen center is also the center of the camera (e.g., the center of the camera sensor). Since that is not the case, aim can be slightly off, which can prevent efficient aiming of the camera.

Figure 2:
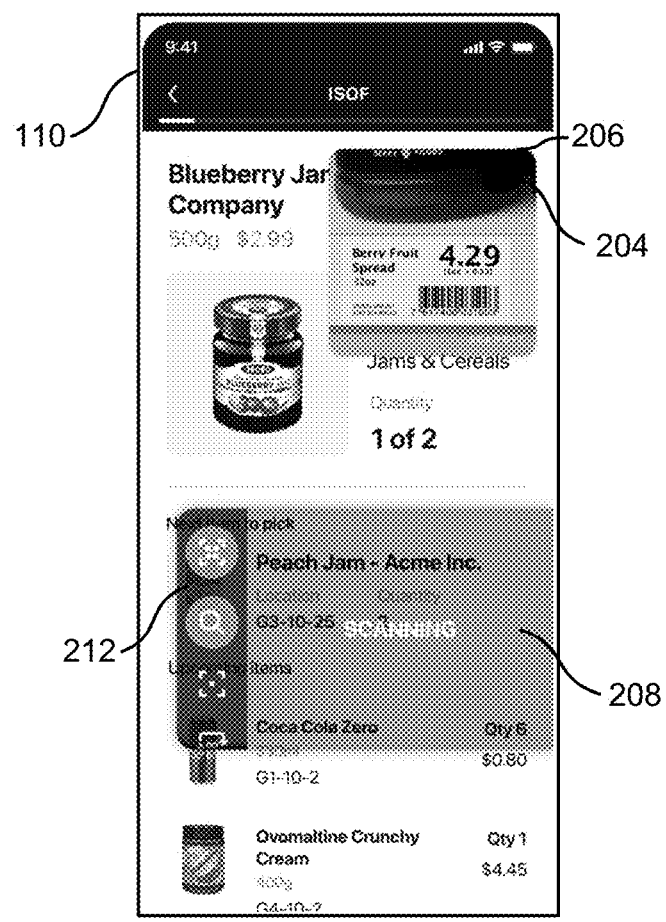
FIG. 2 depicts an embodiment of a display showing a mini preview and a scan button.

FIG. 2 depicts an embodiment of a display 110 showing a preview 204 and a button 208. The preview 204 is a mini preview. The preview 204 is shown in a viewport 206. The viewport 206 is a framed area on a display screen for viewing the preview 204. The preview 204 is shown in the top-right corner of the display 110. The preview 204 is shown on a screen (e.g., on the display 110) directly on top of the camera (e.g., camera sensor), such that a center of the preview 204 roughly aligns with a center of a sensor of the camera. In some embodiments, the center of the preview 204 shown on the display is no more than 3, 2, 1, or 0.5 centimeters off centered (e.g., laterally and/or vertically) from the center of the sensor of the camera. Aiming becomes more natural with less offset between the center of the camera sensor and the center of the preview 204 on the display 110. In some embodiments, thumbnails (e.g., of decoded optical patterns and/or images corresponding to optical patterns) are presented on the display 110, in addition to the preview 204. In certain configurations, the preview 204 (and/or the viewport 206) is not shown when the device is not scanning for optical patterns, such as barcodes. In certain configurations, the preview 204 is shown even while not scanning for optical patterns. Presenting the preview 204 while not scanning can make aiming easier and potentially reduces a number of unintentional scans. For example, a user can aim the camera at a barcode, using the preview 204, and then tap to scan for the barcode.

Some devices have multiple cameras and/or lenses. In some embodiments, a wider-angled lens (e.g., an ultra-wide-angle lens) is automatically switched to if the system detects that the focus distance is too short for the main lens. In some embodiments, autofocus in enabled and/or fast-autofocus features built into the device are used to achieve fast autofocus. Using autofocus can be slower than using a fixed-focus approach, but it can allow for a wider range for scanning distances and/or device.

In some embodiments, the torch is used as an aimer. In some embodiments, the torch is used for dark ambient light situations. In some embodiments, exposure is fixed, or auto-exposure is used. For example, exposure duration can be fixed on iOS devices but not on Android devices. On some devices (e.g., Android devices) the auto-exposure functionality of the device's camera driver is used with a setting to reduce the exposure based on the automatic settings, called target exposure bias. In some embodiments, frame rate is 30 fps (e.g., the high frame rate, such as 120 fps on some devices, is not used). This can allow a fast-scanning mode on some devices (e.g., Android) to be used that does not usually allow frame rates higher than 30 fps. Examples of fast scanning and using the torch as an aimer is provided in U.S. patent application Ser. No. 16/504,989, filed on Jul. 8, 2019, which is incorporated by reference for all purposes.

B. Easy-to-Reach Scan Button

FIG. 2 depicts an embodiment of the button 208. The button 208 is a scan button used to start and/or stop scanning for optical patterns. Scanning can be started by touching an area of the screen corresponding to the button 208. The button 208 is positioned on the display 110 such that it is easy to reach with a thumb and/or does not require looking at the screen to start or stop scanning.

As shown in FIG. 2, the button 208 occupies a significant portion of the screen. The button 208 is located at a bottom part of the screen to make it easier to reach. In some embodiments, the button 208 can be moved (e.g., by the user and/or developer) around on the screen (e.g., to fit a hand size of the operator).

In some embodiments, the scan button is easy to reach and/or is large. For example, the scan button is presented in a lower portion of the display to be reached by a user's thumb. The scan button can be the full width of the display. The scan button could be round and/or be sensitive to touch in an area larger than the scan button. In some embodiments, the scan button is equal to or greater than 10%, 20%, 30%, or 40% of the height of the display and/or equal to or less than 100%, 80%, 60%, 50%, or 40% of the height of the display. The scan button can be a semitransparent overlay on the display. In some configurations the scan button is equal to or wider than 1/3, 2/5, 3/7, 1/2, 3/5, or 2/3 of a width of the screen. In some configurations, the button 208 has an area equal to or greater than 20%, 30%, 40%, 50% of an area of the display and/or equal to or less than 100%, 80%, 60%, 50%, or 40% of the area of the display. A swipe can move, remove, or collapse the scan button. In some configurations a tap or hold anywhere on the display initiates scanning.

The viewport 206, and thus the preview 204, is an overlay of an application window (e.g., the application widow fills the display 110). In some configurations, the viewport 206 and/or the preview 204 is semi-transparent (e.g., so that what is presented in the application window can be partially seen under the preview 204 and/or the viewport 206). The application window can be part of a UX (user experience) design.

The application window is presented on the screen. The viewport and/or the preview is presented on the screen as an overlay so that the application window remains at least partially visible (e.g., the viewport/preview is less than an area of the screen and/or the viewport is semi-transparent). For example, the viewport can be part of a popup window on the application window (e.g., on a previous UX design). The viewport and/or overlay can be moved around, resized, closed, opened, appear, and/or disappear from the screen (e.g., based on a user input and/or a timeout). The user input can be a swipe on the screen, tap on the screen, pressing a hardware button, a shake of the mobile device, or a voice command.

In some configurations the preview (and/or the viewport) has a transparency value equal to or greater than 10, 15, 20, or 15 percent and equal to or less than 60, 75, 80, 85, or 90 percent. In some configurations, the viewport and preview are presented on the screen after presenting the application window on the screen (e.g., the preview is not presented on the screen over the application window until a user action is detected; the preview and/or button is not presented on the screen until more than 1, 2, 5, or more seconds after the application window is presented on the screen).

The preview and the button can be part of an SDK for a previously designed application (e.g., UX). Thus, workflow does not need to be changed for an existing app using a dedicated barcode scanner. An overlay with the preview and/or button can be used for barcode scanning using images acquired by a camera of a mobile device. The SDK adds additional functionality to an existing app for scanning for barcodes. Thus, the preview and/or the button can run over a host application, and previously used layouts and designs can be used. For example, a retailer can have an existing app (e.g., UX) that puts a list of products together and interfaces with a dedicated barcode scanner (e.g., with a laser barcode scanner) for checking a customer out. The retailer can add an SDK with the added functionality of the preview and/or button (e.g., as one or more popup windows overlayed, or on top of, the existing app, along with image barcode scanning functionality) to scan barcodes using image analysis to interface with the existing app to input barcode data into the existing app. The preview and/or button can disappear when not scanning for barcodes or entering barcode data. Thus, barcode data entry can be performed without a dedicated barcode scanner and/or preserve an existing UX.

Figure 3:
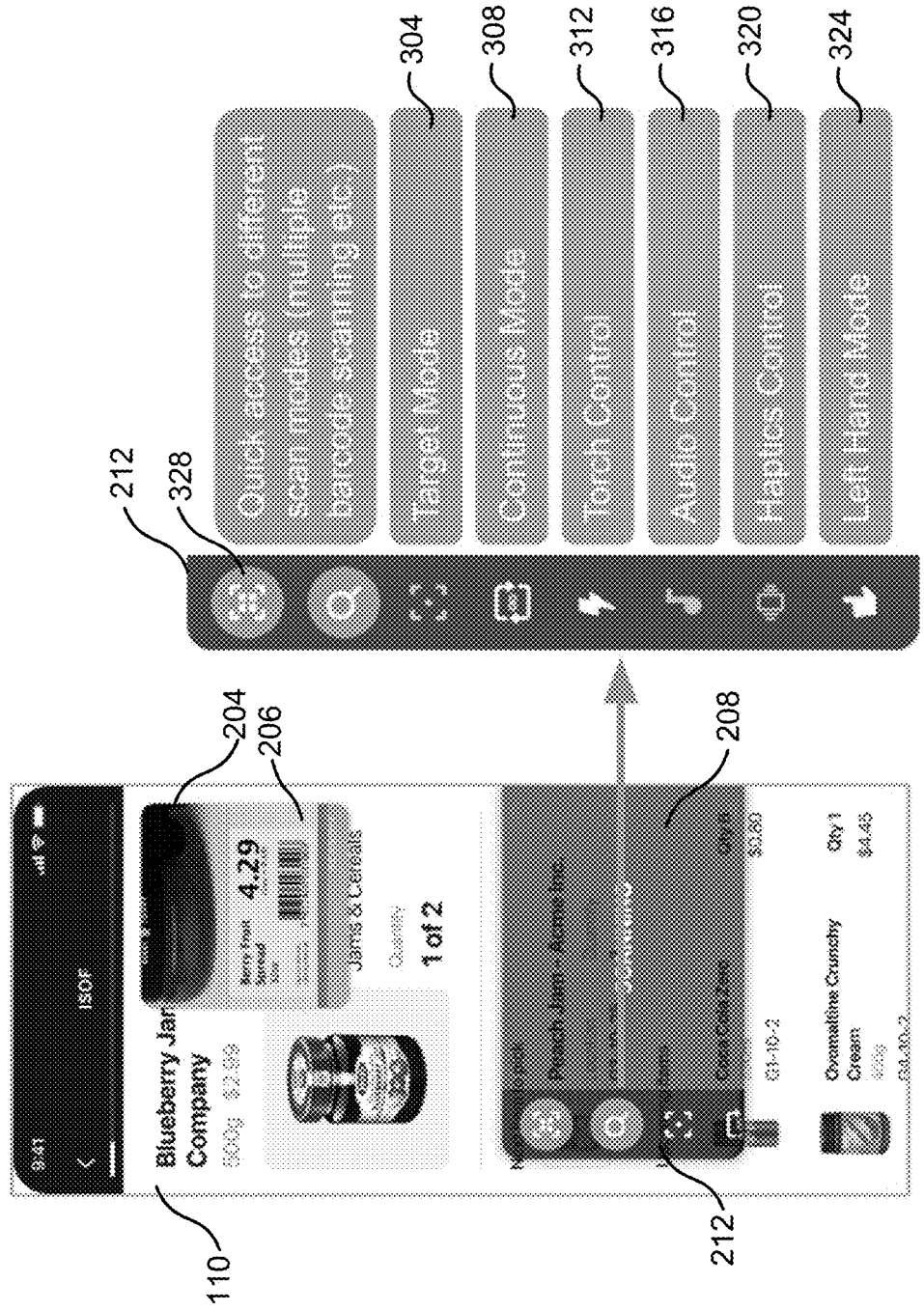
FIG. 3 depicts an embodiment of a toolbar of a floating scan button.

In some configurations, the button 208 includes a toolbar 212. The toolbar 212 is a menu for quick-access features. FIG. 3 depicts an embodiment of a toolbar 212 of the button 208. The toolbar 212 can allow for additional control and/or allow access to certain functionality. The toolbar 212 can allow access to different detecting and decoding modes (e.g., scanning). For example, a user can select a target mode or a continuous mode. The toolbar 212 provides quick access to controls, such as switching between scanning modes.

Torch Control 312 can be used to toggle on/off the torch and/or to increase or decrease a brightness of the torch. In some configurations, increasing or decreasing the brightness of the torch is not available with Torch Control 312 (e.g., to simplify the interface).

Audio Control 316 provides control over audio signals (e.g., how loud and/or what type of sound to play upon successful decoding, or upon unsuccessful decoding, of a barcode; and/or to mute the sound of audio signals). For example, a rising two notes or tones could be played for successful decoding of barcode and a dropping two notes or tones could be played for unsuccessful decoding.

Haptics Control 320 provides control over haptics (e.g., how firm and/or a type of haptic to initiate upon successful decoding, or upon unsuccessful decoding, of a barcode; and/or to turn off haptics). For example, a short (e.g., equal to or less than 0.25, 0.5, or 0.75 seconds), light vibration for a successful decoding and/or a strong, long (e.g., equal to or greater than 0.75, 1, or 1.25 seconds and/or equal to or less than 1.5, 2, 3, or 5 seconds) vibration for unsuccessful decoding.

Left Hand Mode 324 enables the button 208 to be switched to a left side of the screen and/or the toolbar 212 to be switched to the right of the button 208. Placing the button 208 to the left of the screen can make it more convenient for tapping the button 208 while a user holds the mobile device in the left hand.

The toolbar 212 can be scrollable on the button 208. For example, the toolbar 212 on the button 208 shows only two, three, or four items of the toolbar 212 and can be scrolled to reveal other items on the toolbar. In some configurations, the toolbar 212 is not part of the button 208 (e.g., the toolbar 212 is next to the button 208 or put on the bottom of the screen horizontally). Though the toolbar 212 is shown arranged vertically on the button 208, the toolbar 212 could be in other arrangements (e.g., horizontally below or above the button 208).

An accuracy-mode icon 328 can be used to enter an accuracy mode. In accuracy mode, a size of the viewport 204 (and thus the preview 206) can be increased. Similarly, the size of the viewport 204 can be decreased by a tap on the accuracy-mode icon 328 while in accuracy mode to exit the accuracy mode, which will reduce the size of the viewport 204.

Figure 4:
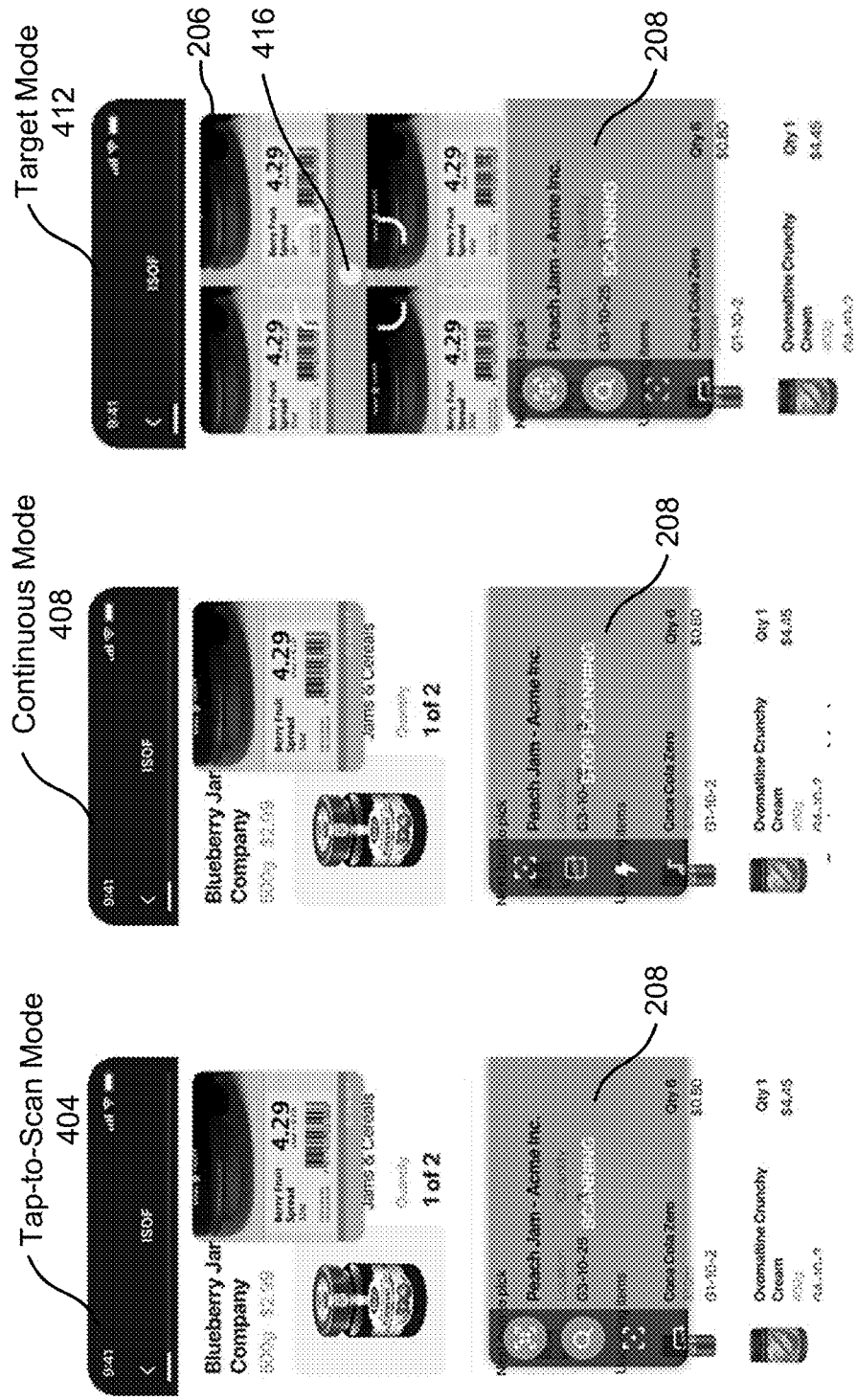
FIG. 4 depicts embodiments of some scan modes.

The toolbar 212 can be used to toggle between scan modes. FIG. 4 depicts embodiments of some scan modes. FIG. 4 depicts examples of a tap-to-scan mode 404, a continuous mode 408, and a target mode 412. Scanning is running an algorithm for detecting and/or decoding an optical pattern, such as a barcode.

In tap-to-scan mode 404, scanning starts after the screen is tapped by the user at an area corresponding to the button 208 (e.g., the button 208 is tapped or touched). In some configurations, scanning is performed by either a tap or touch-and-hold. Tap-to-scan happens when the button 208 is pressed and released before a certain duration of time passes. The certain duration can be a predefined value or learned over time. In some embodiments, the certain duration is a first threshold value. A timer is started at the time a touch is detected. The timer can end when the touch is released or until the timer reaches the first threshold. If the timer ends before the first threshold is reached (e.g., the user removes the finger before the first threshold value), then tap-to-scan (e.g., a first algorithm) is implemented. But if the timer exceeds the first threshold value (and/or exceeds a second threshold value), then hold-to-scan is implemented (e.g., a second algorithm). In some embodiments, the first threshold value is equal to or less than 1, 0.75, 0.5, 0.4, 0.35, or 0.3 seconds and/or equal to or greater than 0, 0.1, 0.2, or 0.3 seconds. For tap-to-scan, scanning can stop after an optical pattern is decoded and/or after a timeout. In some embodiments, the timeout is equal to or greater than 1, 2, or 5 seconds and/or equal to or less than 3, 5, 7, 10, 20, or 30 seconds. In some embodiments, the timeout is reset if an optical pattern is detected and/or decoded.

For hold-to-scan, scanning can be stopped in two ways:
1. when a single optical code is decoded, regardless of the touch state; and/or 2. only when releasing touch, allowing multiple optical codes to be decoded sequentially. Thus, scanning can be implemented based on how long a user is touching the screen (e.g., touching the button 208 with a finger).

For continuous mode 408, scanning occurs until the user taps the button 208. Accordingly, barcodes will be detected and/or decoded within a field of view of the camera until the button 208 it touched. Thus, many barcodes can be detected and/or decoded without the user tapping the button 208. As a barcode is decoded, text, data, and/or a thumbnail related to the decoded barcode is presented on the display. In some configurations, continuous mode 408 can time out (e.g., if no barcodes are detected and/or decoded within specified time such as 1, 2, 3, 5, or 10 minutes).

To enable a user to scan barcodes that are far away (e.g., equal to or greater than 40 cm, 80 cm, 1 m, 1.5 m and/or equal to or less than 2, 3, or 5 meters) without having to bend or reach far up, or to select a desired barcode in a crowded scenario, target mode 412 can be used. In some configurations, a zoom factor is increased in target mode to help increase a scan range and/or aim at barcodes at a distance. For example, a magnifying-glass icon on a menu of an expanded preview or by swiping on the expanded preview be touched to zoom. In target mode 412, the viewport 206 (e.g., and thus the preview 204) expands to ease the aim and/or an aimer overlay 416 is shown on screen to align a barcode to a decoding area. The aimer overlay 416 can be added in other modes than just in target mode. The aimer overlay 416 can be used to scan and/or select a specific barcode in a crowded scenario (e.g., multiple barcodes on the same object and/or many barcodes close together).

Expanding the viewport 206 (e.g., while zoomed in) can aid the user finding and/or selecting a barcode faster and/or more accurately. To select a barcode to scan, in some embodiments, the user aims at the barcode for a predefined amount of time (e.g., 100 ms, 300 ms, or 500 ms), to avoid unintentional scans. The viewport 206 in the target mode 412 does not extend into a bottom half of the screen (e.g., while oriented by the user in portrait mode) or does not extend into one half of the screen (e.g., while oriented by the user in landscape mode). In target mode (e.g., and/or in accuracy mode or in other modes), a barcode can be selected with a tap on the display (e.g., so the user does not wait for a timeout).

Some barcodes scanners are a dedicated scanning device (e.g., having a hardware button to initiate scanning). When using a mobile device for barcode scanning, it can be helpful to have a scan button that is easy to touch (e.g., the scan button shown in FIG. 2). By having the scan button (e.g., button 208) be a semitransparent overlay, the scan button does not have to change workflow of an interface of a preexisting application. For example, a parcel delivery service could have a custom application and barcode scanning functionality could be added to it (e.g., with the mini preview and/or the scan button). A user could open the custom application and when the user goes to scan a package, the scan button appears with the mini preview as an overlay, a barcode is scanned, and/or the scan data is entered into a field of the custom application.

Figure 5:
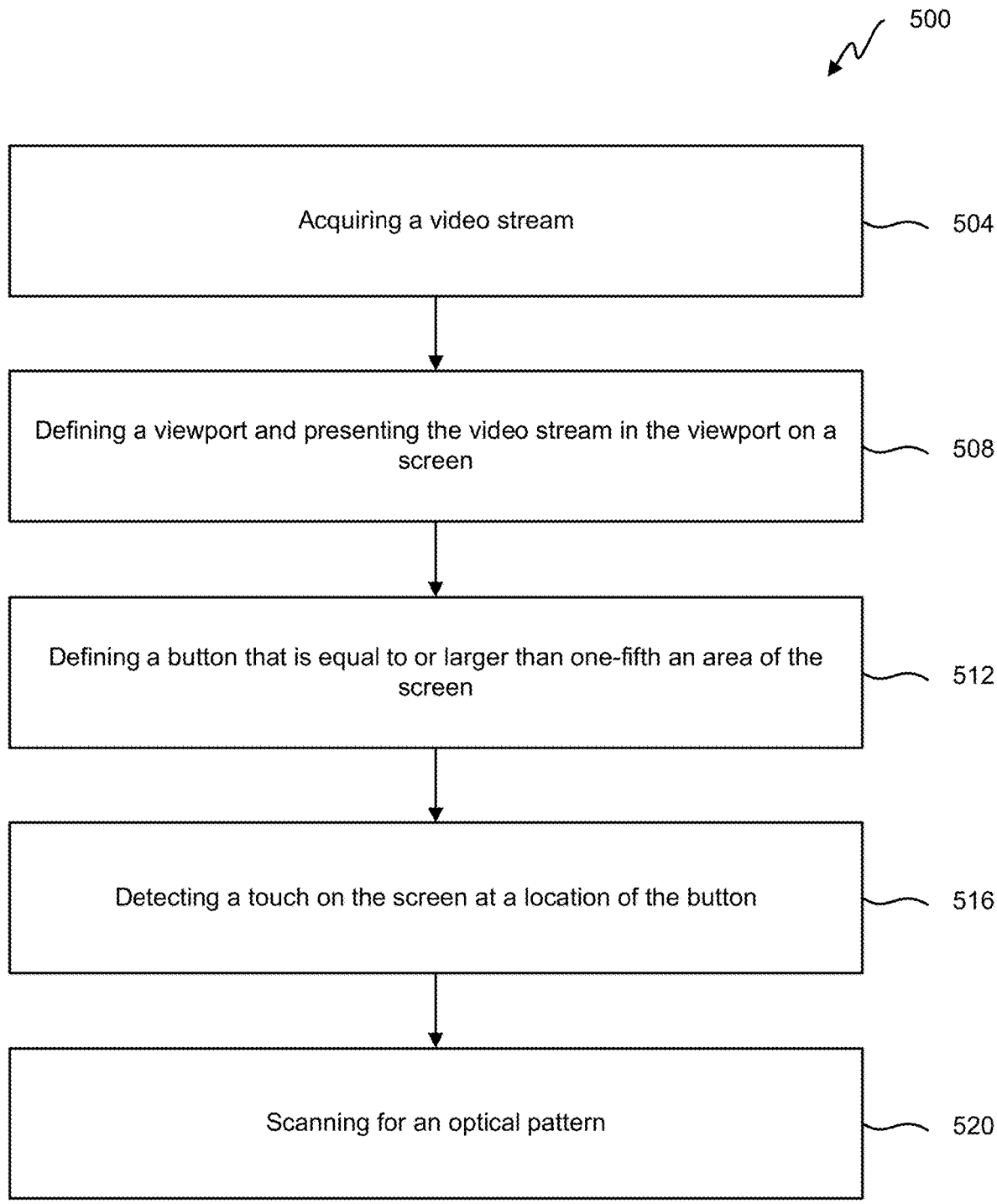
FIG. 5 illustrates a flowchart for an embodiment of a process for using a large button during scanning.

FIG. 5 illustrates a flowchart for an embodiment of a process 500 for using a large button during scanning for an optical pattern in a real scene. Process 500 begins in step 504 with acquiring a video stream (e.g., using a camera of a mobile device). The video stream comprises preview images of an optical pattern in the real scene.

In step 508 a viewport is defined, and the video stream is presented in the viewport on a screen. For example, the preview 204 is shown in the viewport 206 in FIG. 2.

In step 512 a button that is equal to or larger than ⅕ of an area of the screen is defined. For example, button 208 in FIG. 2 is defined and presented on display 110. The button is large to allow for easy touching while not looking directly at the screen.

In step 516, a touch on the screen is detected at a location of the button. In step 520 scanning for an optical pattern in the real scene, based on a plurality of images, is started (e.g., based on detecting the touch on the screen at the location of the button). For example, one or more scanning modes in FIG. 4 are used (e.g., scan when tapped, scan when held, continuous scanning, target mode, etc.). In some configurations, a toolbar is part of or next to the button (e.g., toolbar 212 in FIG. 3). The toolbar can be used to switch between scanning modes. The button can be movable, or "floating," such that a user can modify a position of the button the screen (e.g., by "dragging" the button on the screen). In some configurations, the viewport is removed when the system is not scanning for an optical code.

C. Reduced Preview

One issue with scanning at near range is a narrow depth-of-field of smartphone cameras. When an object is closer than a shortest-possible focus distance, the object appears blurry. To successfully recognize the barcode, in some embodiments, a user moves the camera farther away from the barcode. In some embodiments, blurry codes can be scanned with blurry-decoding technology, such as described in commonly owned U.S. patent application Ser. No. 17/855,270, filed on Jun. 30, 2022, which in incorporated for all purposes. But in general, it is preferable to have sharp images. Hard-to-scan cases (e.g., glare, angled, curved) can benefit from being in focus.

To guide the user to increase a distance between the optical pattern and the camera (e.g., to place the barcode farther away from the camera, and/or to move the camera farther away from the optical pattern), a reduced preview area can be used. A reduced preview area can be faster than using visual markers (e.g., corner hash marks) to guide a user because a user does not have to process where visual markers are in relation to an optical code or document to be decoded. For example, using visual markers can sometimes give a user too much information. By cropping the preview area, a user moves the camera backward or forward in a more natural manner compared to a user trying to move a camera backward or forward to have the optical pattern fit within visual marks.

Figure 6:
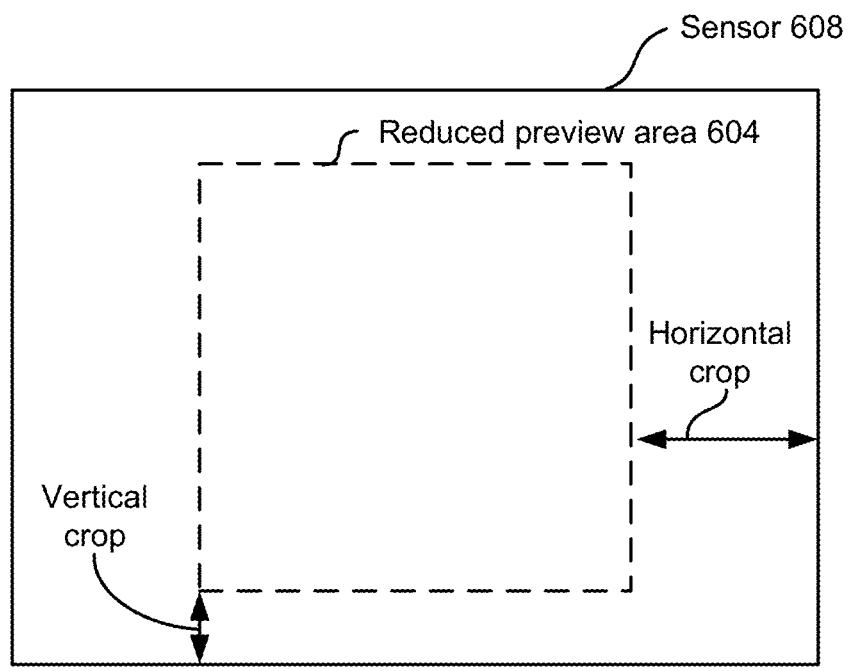
FIG. 6 illustrates an embodiment of a preview area cropped for a mini preview.

FIG. 6 shows an embodiment of a reduced preview area 604. The reduced preview is a portion (not all) of the data obtained from a sensor 608 (e.g., image sensor of the camera). The reduced preview can be cropped horizontally and/or vertically from sensor data from the sensor 608. In some embodiments, truncating the horizontal direction of the preview can be more important than truncating the vertical direction (e.g., while a barcode long axis is oriented horizontally in the preview). In some configurations, the reduced preview just truncates (e.g., crops) what is shown to the user, not what is processed, which can enable a barcode to be decoded even though the barcode does not fully fit within the reduced preview area 604.

The reduced preview shows a center crop of the sensor 608. The crop can be configured in a way that typical code sizes scan comfortably when the code fully occupies the reduced preview area 604. For example, the reduced preview could have a width (e.g., in the horizontal direction)

that is equal to or less than 80%, 75%, 60%, or 50% of a width of the sensor 608 and/or a width equal to or greater than 15%, 20%, 25%, 30%, 40%, or 50% of the width of the sensor 608 (e.g., measured in pixels).

A width of the reduced preview area 604 can be application specific and/or depend on which codes are expected to be scanned. In some embodiments, area inside and outside the reduced preview area 604 (e.g., the area of the sensor) is scanned (e.g., to allow scanning codes that are larger than the typical code size, wherein at least a portion of the code is within the reduced preview and/or center of the camera). For example, a "normal" length barcode could be EAN-13, EAN-8, and/or UPC-A (e.g., or a fixed-size barcode). But a user might decode a longer barcode (e.g., a code 128 barcode) on occasion. If the longer barcode didn't fit inside the reduced preview, but still within the uncropped preview, then then longer barcode could still be decoded. In another example, a "normal" length barcode could be a first code 128 (e.g., a shelf label) and a second code 128 (e.g., an internal code for stock) could be a longer (e.g., wider) barcode.

In some embodiments, zoom is not used for the reduced preview area because some mobile devices use a digital zoom, and the digital zoom would cause the preview to not show the desired area and/or not show the optical pattern. In some configurations, reducing or increasing the size of the reduced preview area 604 is based on "zooming" in and out using a zoom (e.g., a magnifying-glass icon) on the toolbar 212 in FIG. 3.

In some embodiments, the reduced preview is combined with the mini preview (e.g., centering a reduced preview near a camera sensors center). In some embodiments, the mini preview is a condensed version of the camera preview (e.g., a preview from an area of the sensor 608), whereas the reduced preview is a cropped portion of data from the sensor 608. In some configurations, a center of the reduced preview area 604 is not co-located with a center of the sensor 608. Offsetting the reduced preview area 604 can be centered with the viewport on the screen (e.g., centered with viewport 206 in FIG. 2) if the viewport is not centered with the sensor of the camera.

In some embodiments, an aspect ratio is chosen by the application. When a camera is accessed, the camera is configured at a certain aspect ratio (e.g., 4:3 or 16:9). Applicant has found that selection of an aspect ratio of 4:3 is preferable, in some configurations (e.g., it helps enlarge a field of view of the camera; has 30% more pixels). In some embodiments, the application automatically switches and/or automatically selects a predefined aspect ratio for decoding optical patterns.

Figure 7:
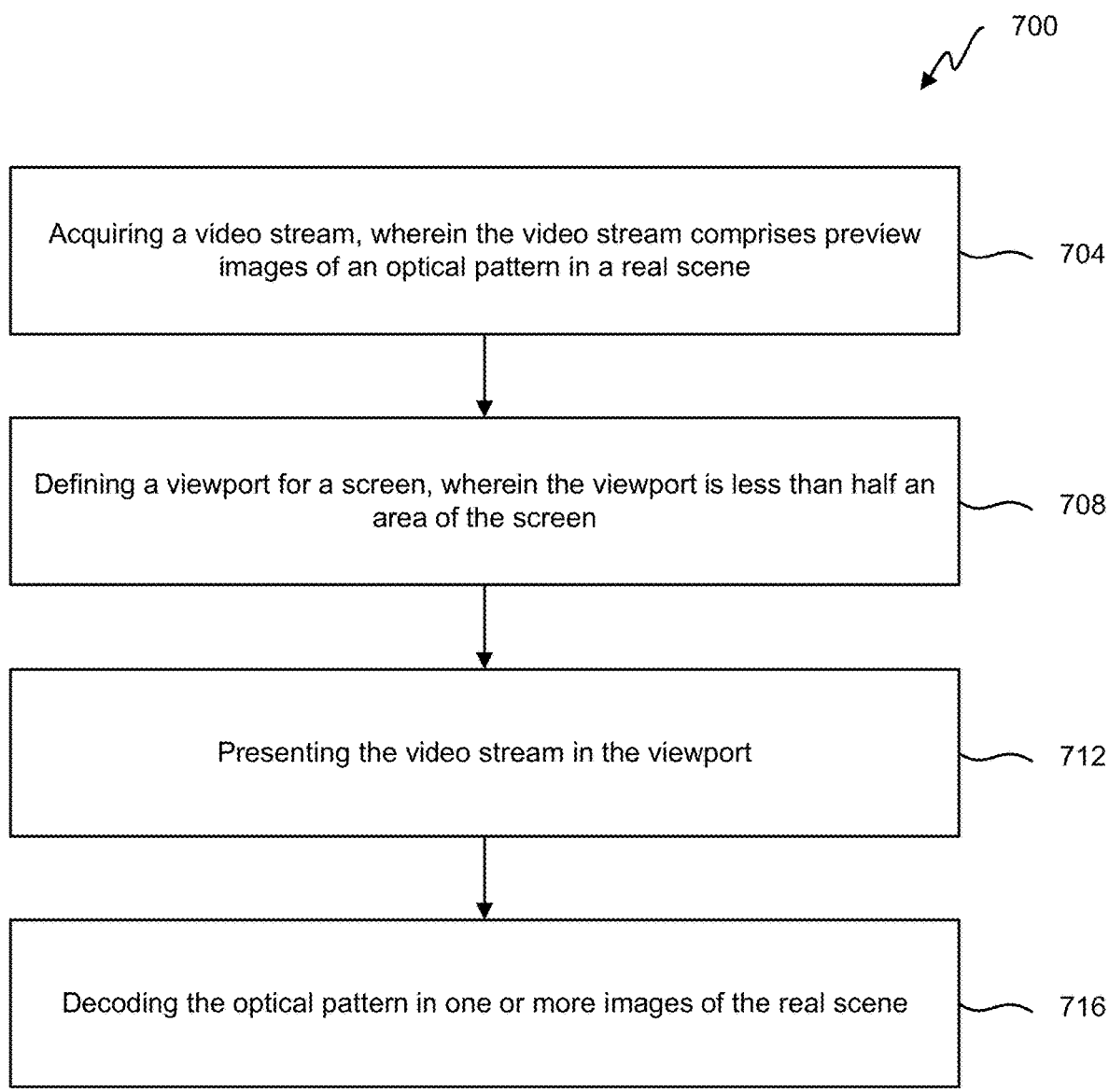
FIG. 7 illustrates a flowchart for an embodiment of a process for a mini preview.

FIG. 7 illustrates a flowchart for an embodiment of a process 700 for decoding an optical pattern in a real scene using a mini preview. Process 700 begins in step 704 with acquiring a video stream (e.g., using a camera of a mobile device). The video stream comprises preview images of an optical pattern in a real scene. The optical pattern is in the real scene.

In step 708, a viewport for a screen is defined. For example, the viewport 206 is defined for display 110 in FIG. 2. In defining the viewport, a height of the viewport, a width of the viewport, and/or a location of the viewport on the display 110 can be defined. The viewport is less than half an area of the screen (e.g., an area of the viewport 206 in FIG. 2 is less than half an area of the display 110). In some configurations, the viewport is greater than half a width of the display and less than half a height of the display (e.g., see the viewport in the target mode 412 in FIG. 4).

The video stream is presented in the viewport on the screen, step 712. At least a portion of the optical pattern is depicted in the viewport. In step 716, the optical pattern is decoded in one or more images of the real scene acquired by the camera. The one or more images could be the preview images or images other than the preview images (e.g., if the preview images are cropped images as discussed in conjunction with FIG. 6, then the one or more images used for decoding could be non-cropped images).

In some configurations, a center of the viewport is offset from a center of the screen. For example, a center of the viewport can be positioned on the screen to correspond to a center of a camera sensor in relation to the screen (e.g., if the camera is in an upper-right portion of a mobile device, then the viewport can be rendered in an upper-right portion of the screen of the mobile device). A thumbnail image of the optical pattern can be presented on the screen while presenting the video stream in the viewport on the screen. For example, after a barcode is decoded, information about the decoded barcode is presented on the screen outside the viewport while still presenting the video stream in the viewport. If more than one barcode has been decoded, multiple (or a plurality) of values of decoded optical patterns can be presented on the screen (e.g., outside of the viewport).

A size of the viewport can be changed (e.g., increased, decreased, and/or resized). For example, the viewport is smaller while scanning in tap-to-scan mode 404, and the viewport is larger while scanning in target mode 412, as shown in FIG. 4. The viewport can be decreased in size after decoding the optical pattern. For example, the viewport is reduced for the tap-to-scan mode after decoding a barcode using the target mode.

Some mobile devices have multiple cameras. If a focus routine to focus on the optical pattern using a first camera does not focus on the optical pattern (e.g., the optical pattern is ascertained to be too close for the first camera to focus on the optical pattern), then a second camera (e.g., having a wider-angle lens) is switched to for acquiring the video stream.

In some configurations the preview images are cropped images acquired by the camera (e.g., images are cropped to the reduced preview area 604 as discussed in conjunction with FIG. 6). In some configurations, a graphic is overlayed on the video stream in the viewport to indicate that the optical pattern (e.g., a barcode) has been decoded. For example, a red or green transparent box is overlayed on the barcode in the video stream to indicate the barcode has been decoded.

In some embodiments, a method for decoding an optical pattern in a real scene comprises acquiring a video stream using a camera of a mobile device, wherein the video stream comprises preview images of the real scene and the optical pattern is in the real scene; presenting an application window on a screen of a mobile device; overlaying the application window with a viewport, wherein the application window remains at least partially visible; presenting, in the viewport, the video stream on the screen of the mobile device, wherein at least a portion of the optical pattern is depicted in the viewport; and/or decoding the optical pattern in one or more images of the real scene acquired by the camera.

D. Camera Start Optimizations

Figure 8:
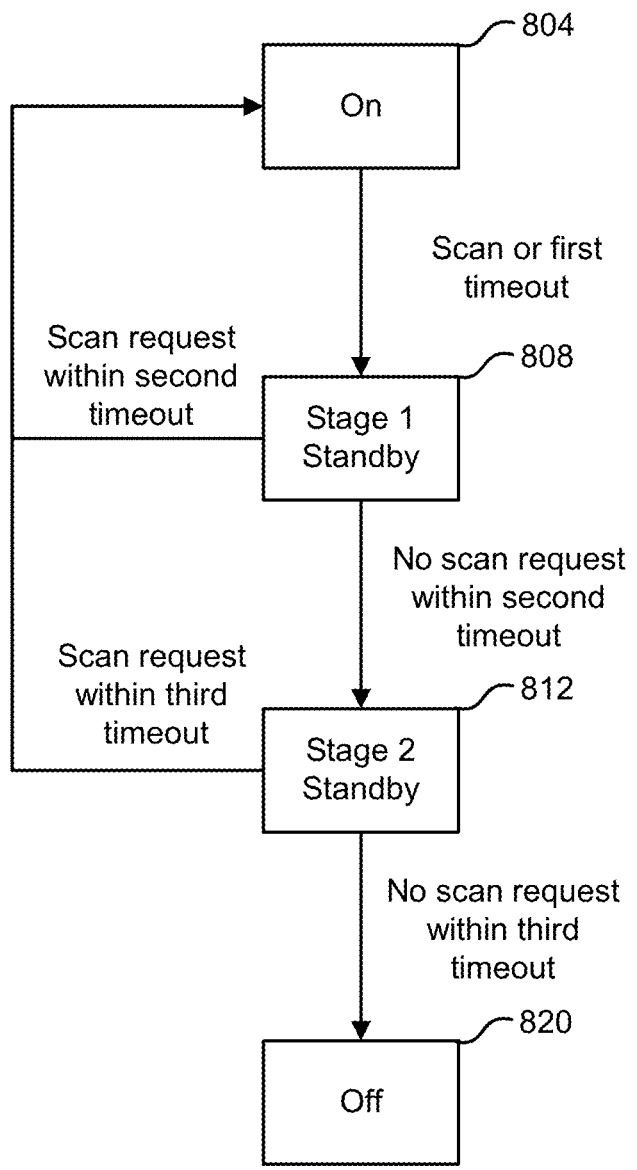
FIG. 8 illustrates a flow diagram of an embodiment of a camera start optimization.

FIG. 8 illustrates a flow diagram of an embodiment of a camera start optimization routine.

To quickly scan codes (e.g., optical patterns such as barcodes), it can be beneficial to have a short time between initiating a barcode scan request and receiving a first frame, which contains a barcode, from the camera. On smartphones, "cold camera starts" are relatively costly and can take in the range of 300+milliseconds from the time when a camera start is requested to receive the first frame. Having the camera on all the time does not work for some configurations because it can drain the battery.

In some applications for barcode scanning, it is more likely that a second barcode scan is requested shortly after a first barcode scan. In some embodiments, a method comprises one or more of the following steps:

The camera is turned on 804.

After a barcode scan request has completed, either because a code was successfully scanned or due to timeout, the camera is put into a stage 1 standby mode 808, a first mode that can be referred to as an "immediately ready" mode. In the first mode, certain processing and or battery consumption is reduced, such as the preview is frozen and/or no barcode recognition happens. But other processes can keep running. For example, the camera keeps running in the background.

If no new scan is requested within a first certain time duration (e.g., 2, 3, 5, 10, 15, 20, 30, 60, 120, or more seconds), then the camera is dropped to a stage 2 standby mode 812, a second mode. In the second mode, the camera and/or mobile device uses less power than the first mode. This is sometimes referred to as the "standby mode." Examples of standby modes are given in U.S. patent application Ser. No. 17/186,898, filed on Feb. 26, 2021 and U.S. patent application Ser. No. 17/541,957, filed on Dec. 3, 2021, which are incorporated by reference for all purposes. In the second mode, the camera can be in a state where it is semi-initialized, but draws relatively little power. In some embodiments, the user does not see that the camera is on in the second mode.

If no scan happens within a second time certain time duration (e.g., 0.5, 1, 2, 5, 10, or 20 minutes), then the camera is turned off 820 (e.g., completely) to preserve power.

In some configurations, stage 1 standby 808 is not running a preview (e.g., preview 204 in FIG. 2) and/or not running a scan algorithm. In stage 2 standby mode 812, there is even lower power consumption than stage 1. In some configurations, software is provided (e.g., to a developer) as an add on to another application.

Figure 9:
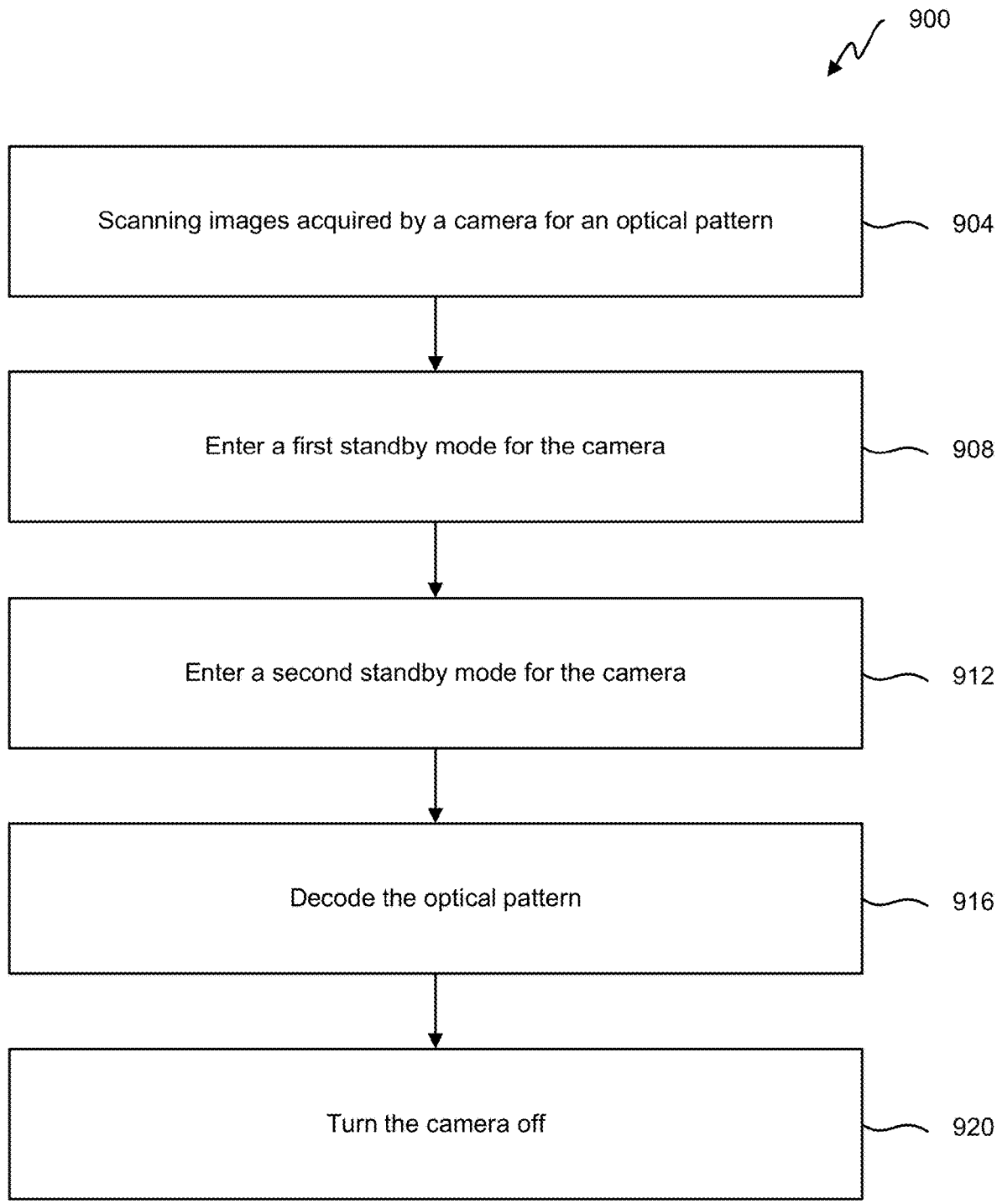
FIG. 9 illustrates a flowchart for an embodiment of a process for a dual standby mode.

FIG. 9 illustrates a flowchart for an embodiment of a process 900 for a dual standby mode for scanning optical patterns in a real scene. Process 900 begins in step 904 with scanning images acquired by a camera for an optical pattern. For example, the camera is turned on 809 in FIG. 8, the camera acquires a plurality of images, and the plurality of images are scanned to detect and/or decode the optical pattern.

After the barcode is detected, or after a first duration of time, the system (e.g., camera and/or the mobile device) enters a first standby mode, step 908. For example, after no scan request for the first duration of time, the system enters the stage 1 standby mode in FIG. 8. A scan request can be a tap of the button 208 in FIG. 2. In some situations, the system enters the first standby mode after successfully decoding the optical pattern. In some situations, the system enters the first standby mode based on detecting a tap on the screen from the user (e.g., the user taps the button 208 during continuous mode 408 in FIG. 4 to stop scanning).

If there is not a scan request for a second duration of time, the system enters a second standby mode, step 912. For example, if there is not scan request, after the system is in the first standby mode, then the system enters the stage 2 standby mode in FIG. 8. The second standby mode uses less power than the first standby mode.

In step 916, the optical pattern is decoded. For example, a barcode is decoded in a plurality of images after step 904 and before step 908, after step 908 and before step 912, after step 912 and before step 920 or before step 904.

If the system is in the second mode standby and no scan request is made for a third duration of time, then the camera is turned off, step 920. For example, the system is in the second standby mode and, after 20 minutes without receiving a scan request, the system turns off 820 in FIG. 8. In some situations, the camera turns off after an application running on the mobile device for decoding barcodes is terminated (e.g., the user closes the app).

Figure 10:
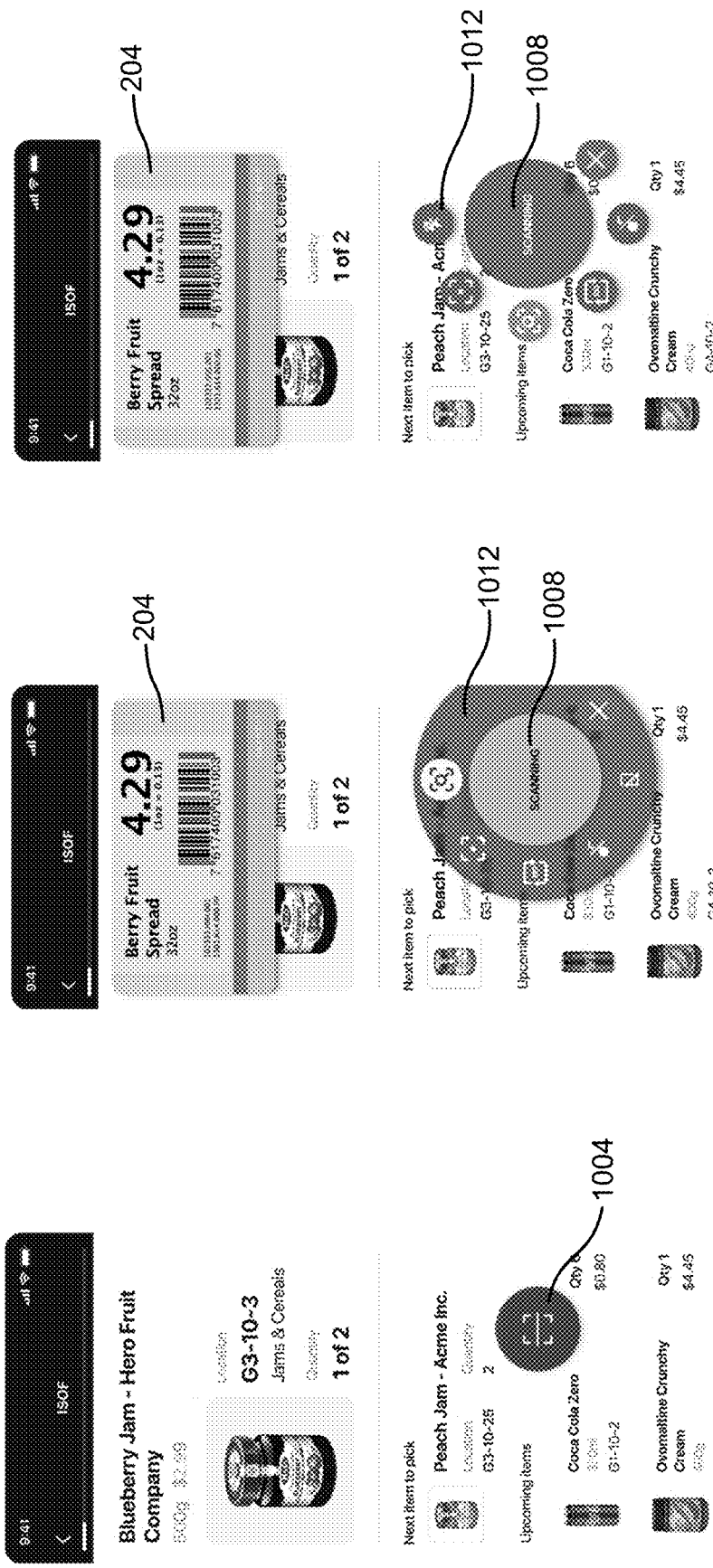
FIG. 10 depicts another embodiment of a user interface.

FIG. 10 depicts another embodiment of a user interface. Different styles of a user interface can look different (e.g., than interfaces shown in FIGS. 2-4) and/or better fit different use cases and/or workflows (e.g., for business to consumer implementations). In certain configurations, an aspect and/or behavior of the mini preview and/or the scan button can change to better fit different use cases and/or end-user behaviors.

FIG. 10 depicts an embodiment of a start button 1004. After a user taps the start button 1004, a viewport with the preview 204 appears on the display, and a button 1008 appear on the display. The button 1008 can have similar functionality as the button 208 in FIG. 2. The button 1008 is circular in shape. A toolbar 1012 is arranged as part of, or around, the button 1008. The toolbar 1012 can have similar functionality as the toolbar 212 in FIG. 2. Icons in the toolbar 1012 are arranged in a circle, in a partial circle, and/or along a curve. The button 1008 can be tapped to start and/or to stop scanning for optical patterns. The toolbar 1012 can be used to select different scanning modes and/or different scanning functionality.

The preview 204 is in line with the camera vertically and extends to a full width of the screen horizontally (e.g., for ease of aim). The preview 204, the button 1008, and/or the toolbar 1012 (e.g., with the button 1008) can be dragged and dropped on the screen. For example, if the preview 204 is covering important information that is used or referenced while scanning, the preview 204 can be dragged to a different part of the screen. The button 1008 can be a freely floating element or anchored to a side of the screen. The button 1008 can be dragged and dropped on the screen (e.g., if the button 1008 is covering important information while scanning). The button 1008 occupies less area on the screen than the button 208 in FIG. 2. In some configurations, developers can choose between different styles (e.g., of buttons and/or viewports) to match an application and/or branding.

E. Computing Device

Figure 11:
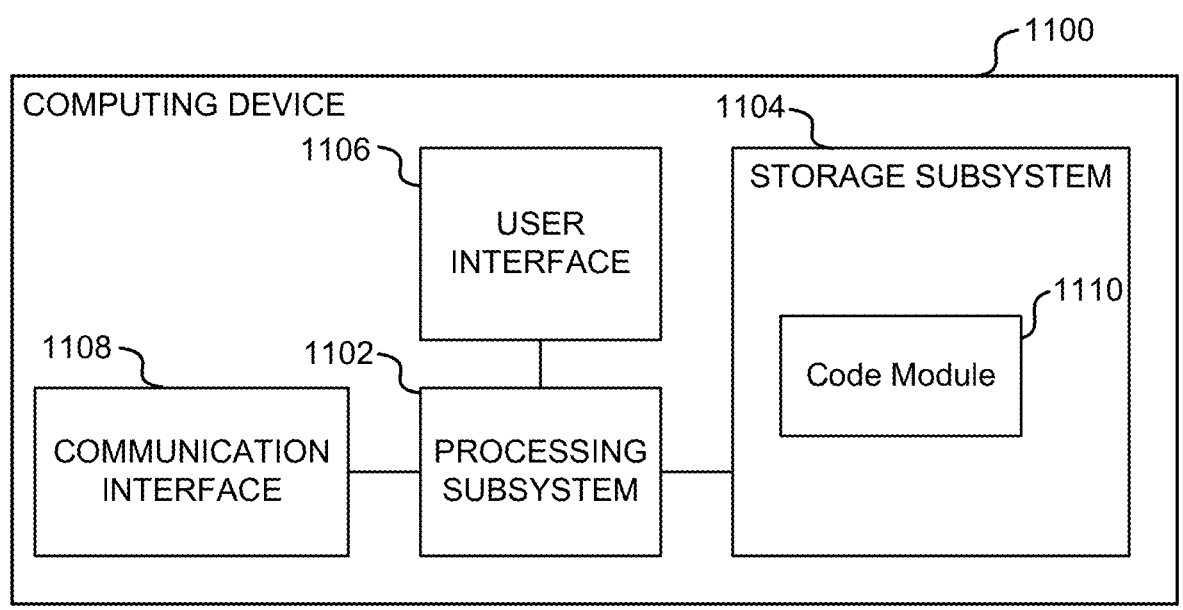
FIG. 11 depicts a block diagram of an embodiment of a computer system.

FIG. 11 is a simplified block diagram of an embodiment of a computing device 1100. Computing device 1100 can implement some or all functions, behaviors, and/or capabilities described above that would use electronic storage or processing, as well as other functions, behaviors, or capabilities not expressly described. Computing device 1100 includes a processing subsystem 1102, a storage subsystem 1104, a user interface 1106, and/or a communication interface 1108. Computing device 1100 can also include other components (not explicitly shown) such as a battery, power controllers, and other components operable to provide various enhanced capabilities. In various embodiments, computing device 1100 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1104 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1104 can store one or more applications and/or operating system programs to be executed by processing subsystem 1102, including programs to implement some or all operations described above that would be performed using a computer. For example, storage subsystem 1104 can store one or more code modules 1110 for implementing one or more method steps described above.

A firmware and/or software implementation may be implemented with modules (e.g., procedures, functions, and so on). A machine-readable medium tangibly embodying instructions may be used in implementing methodologies described herein. Code modules 1110 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1110) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1110 may comprise sets of instructions (codes) embodied on a computer-readable medium that directs a processor of a computing device 1100 to perform corresponding actions. The instructions may be configured to run in sequential order, in parallel (such as under different processing threads), or in a combination thereof. After loading a code module 1110 on a general purpose computer system, the general purpose computer is transformed into a special purpose computer system.

Computer programs incorporating various features described herein (e.g., in one or more code modules 1110) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1104 can also store information useful for establishing network connections using the communication interface 1108.

User interface 1106 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1106 to invoke the functionality of computing device 1100 and can view and/or hear output from computing device 1100 via output devices of user interface 1106. For some embodiments, the user interface 1106 might not be present (e.g., for a process using an ASIC).

Processing subsystem 1102 can be implemented as one or more processors (e.g., integrated circuits, one or more single-core or multi-core microprocessors, microcontrollers, central processing unit, graphics processing unit, etc.). In operation, processing subsystem 1102 can control the operation of computing device 1100. In some embodiments, processing subsystem 1102 can execute a variety of programs in response to program code and can maintain multiple concurrently executing programs or processes. At a given time, some or all of a program code to be executed can reside in processing subsystem 1102 and/or in storage media, such as storage subsystem 1104. Through programming, processing subsystem 1102 can provide various functionality for computing device 1100. Processing subsystem 1102 can also execute other programs to control other functions of computing device 1100, including programs that may be stored in storage subsystem 1104.

Communication interface 1108 can provide voice and/or data communication capability for computing device 1100. In some embodiments, communication interface 1108 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1108 can provide wired connectivity (e.g., universal serial bus, Ethernet, universal asynchronous receiver/transmitter, etc.) in addition to, or in lieu of, a wireless interface. Communication interface 1108 can be implemented using a combination of hardware (e.g., driver circuits, antennas, modulators/demodulators, encoders/decoders, and other analog and/or digital signal processing circuits) and software components. In some embodiments, communication interface 1108 can support multiple communication channels concurrently. In some embodiments the communication interface 1108 is not used.

It will be appreciated that computing device 1100 is illustrative and that variations and modifications are possible. A computing device can have various functionality not specifically described (e.g., voice communication via cellular telephone networks) and can include components appropriate to such functionality.

Further, while the computing device 1100 is described with reference to particular blocks, it is to be understood that these blocks are defined for convenience of description and are not intended to imply a particular physical arrangement of component parts. For example, the processing subsystem 1102, the storage subsystem, the user interface 1106, and/or the communication interface 1108 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1100.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system comprising:
   a camera; and
   a computer readable storage medium storing instruction that, when executed by one or more processors, cause the one or more processors to perform operations comprising:
   capturing, using the camera, a first image depicting a first optical pattern;
   decoding, within the first image, the first optical pattern;
   switching the camera to a first mode corresponding to a first power consumption level;
   ascertaining that the camera has been in the first mode for a first period of time;
   in response to ascertaining that the camera has been in the first mode for the first period of time, switching the camera to a second mode corresponding to a second power consumption level, wherein the second power consumption level is less than the first power consumption level;
   detecting that a code scanning request has been received while the camera is in the second mode; and
   in response to detecting that the code scanning request has been received while the camera is in the second mode, capturing, using the camera, a second image depicting a second optical pattern.

2. The system of claim 1, wherein capturing the first image comprises capturing the first image with the camera operating at a third power consumption level, the third power consumption level being greater than at least one of the first power consumption level and the second power consumption level.

3. The system of claim 1, wherein switching the camera to the first mode comprises operating the camera while suspending display of a preview image.

4. The system of claim 1, wherein the code scanning request is a first code scanning request, and the operations further comprising, prior to determining that the camera has been in the first mode for the first period of time, detecting that a second code scanning request has been received while the camera is in the first mode.

5. The system of claim 4, the operations further comprising, in response to detecting that the second code scanning request has been received while the camera is in the first mode, capturing, using the camera, a third image depicting a third optical pattern.

6. A method comprising:
capturing, using a camera, a first image depicting a first optical pattern;
decoding, within the first image, the first optical pattern;
switching the camera to a first mode corresponding to a first power consumption level;
ascertaining that the camera has been in the first mode for a first period of time;
in response to ascertaining that the camera has been in the first mode for the first period of time, switching the camera to a second mode corresponding to a second power consumption level, wherein the second power consumption level is less than the first power consumption level;
detecting that a code scanning request has been received while the camera is in the second mode; and
in response to detecting that the code scanning request has been received while the camera is in the second mode, capturing, using the camera, a second image depicting a second optical pattern.

7. The method of claim 6, wherein capturing the first image comprises capturing the first image with the camera operating at a third power consumption level, the third power consumption level being greater than at least one of the first power consumption level and the second power consumption level.

8. The method of claim 6, wherein switching the camera to the first mode comprises operating the camera while suspending display of a preview image.

9. The method of claim 6, wherein the code scanning request is a first code scanning request, and wherein the method further comprises, prior to determining that the camera has been in the first mode for the first period of time, detecting that a second code scanning request has been received while the camera is in the first mode.

10. The method of claim 9, further comprising, in response to detecting that the second code scanning request has been received while the camera is in the first mode, capturing, using the camera, a third image depicting a third optical pattern.

11. The method of claim 10, wherein capturing the second image comprises capturing the second image with the camera operating at a third power consumption level, the third power consumption level being greater than the first power consumption level.

12. The method of claim 6, further comprising determining that the camera has been in the second mode for a second period of time.

13. The method of claim 12, further comprising, in response to determining that the camera has been in the second mode for the second period of time, turning the camera off.

14. The method of claim 6, wherein capturing the second image comprises capturing the second image with the camera operating at a third power consumption level, the third power consumption level being greater than at least one of the first power consumption level and the second power consumption level.

15. The method of claim 6, further comprising prior to capturing the first image, turning the camera on.

16. One or more non-transitory computer-readable media storing computer-readable instructions that, when executed by one or more processors, cause a system to perform operations comprising:
capturing, using a camera, a first image depicting a first optical pattern;
decoding, within the first image, the first optical pattern;
switching the camera to a first mode corresponding to a first power consumption level;
ascertaining that the camera has been in the first mode for a first period of time;
in response to ascertaining that the camera has been in the first mode for the first period of time, switching the camera to a second mode corresponding to a second power consumption level, wherein the second power consumption level is less than the first power consumption level;
detecting that a code scanning request has been received while the camera is in the second mode; and
in response to detecting that the code scanning request has been received while the camera is in the second mode, capturing, using the camera, a second image depicting a second optical pattern.

17. The one or more non-transitory computer-readable media of claim 16, wherein capturing the first image comprises capturing the first image with the camera operating at a third power consumption level, the third power consumption level being greater than at least one of the first power consumption level and the second power consumption level.

18. The one or more non-transitory computer-readable media of claim 16, wherein switching the camera to the first mode comprises operating the camera while suspending display of a preview image.

19. The one or more non-transitory computer-readable media of claim 16, wherein the code scanning request is a first code scanning request, and the operations further comprising, prior to determining that the camera has been in the first mode for the first period of time, detecting that a second code scanning request has been received while the camera is in the first mode.

20. The one or more non-transitory computer-readable media of claim 19, the operations further comprising, in response to detecting that the second code scanning request has been received while the camera is in the first mode, capturing, using the camera, a third image depicting a third optical pattern.

* * * * *